United States Patent
Lee

(10) Patent No.: US 8,160,303 B2
(45) Date of Patent: Apr. 17, 2012

(54) CAMERA DEVICE AND MOTION DETECTION METHOD FOR THE SAME

(75) Inventor: Hou-Hsien Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 501 days.

(21) Appl. No.: 12/424,513

(22) Filed: Apr. 15, 2009

(65) Prior Publication Data
US 2010/0239127 A1    Sep. 23, 2010

(30) Foreign Application Priority Data
Mar. 17, 2009   (CN) ..................... 2009 1 0300899

(51) Int. Cl.
G06K 9/00    (2006.01)
H04N 7/18    (2006.01)

(52) U.S. Cl. .............. 382/107; 348/154; 348/155
(58) Field of Classification Search .............. 382/103, 382/107, 236; 348/154, 155, 47–50, 151, 348/153, 169–172, 175, 207.99, 208.1, 208.16, 348/352; 386/210, 223, 224, 243
See application file for complete search history.

(56) References Cited

U.S. PATENT DOCUMENTS

| | | | | |
|---|---|---|---|---|
| 5,036,474 A * | 7/1991 | Bhanu et al. | .................. | 348/117 |
| 7,362,911 B1 * | 4/2008 | Frank | .................. | 382/260 |
| 7,809,214 B2 * | 10/2010 | Disatnik et al. | .................. | 382/313 |
| 8,073,196 B2 * | 12/2011 | Yuan et al. | .................. | 382/103 |

* cited by examiner

*Primary Examiner* — Abolfazl Tabatabai
(74) *Attorney, Agent, or Firm* — Altis Law Group, Inc.

(57) ABSTRACT

A camera device is capable of detecting a motion scene. The camera device captures a number of consecutive images of the motion scene, calculates characteristic values of the plurality of consecutive images, and stores the characteristic values. The camera device further matches two consecutive images among the plurality of consecutive images according to the characteristic values of the two consecutive images to obtain a corresponding area and compares the characteristic values of the corresponding area in the two consecutive images to obtain a motion area of the motion scene, with different characteristic values of the corresponding area.

18 Claims, 6 Drawing Sheets

CAMERA DEVICE AND MOTION DETECTION METHOD FOR THE SAME

BACKGROUND

1. Technical Field

The present disclosure relates to camera devices, and particularly to a camera device and a motion detection method for the camera device.

2. Description of Related Art

Generally, a security camera is employed in a monitored area such as a bank vault or an enterprise confidential location for security, to detect motion objects. The security camera captures a plurality of consecutive images of the monitored area and analyzes pixels of the plurality of consecutive images, to obtain the motion objects in the monitored area. However, a camera body or a camera lens of the security camera cannot be moved or shifted when the security camera is used to monitor the monitored area. If the camera body is moved or the camera lens is shifted, the security camera may not accurately detect the motion objects in the monitored area, thereby raising safety concerns.

DETAILED DESCRIPTION

Figure 1:
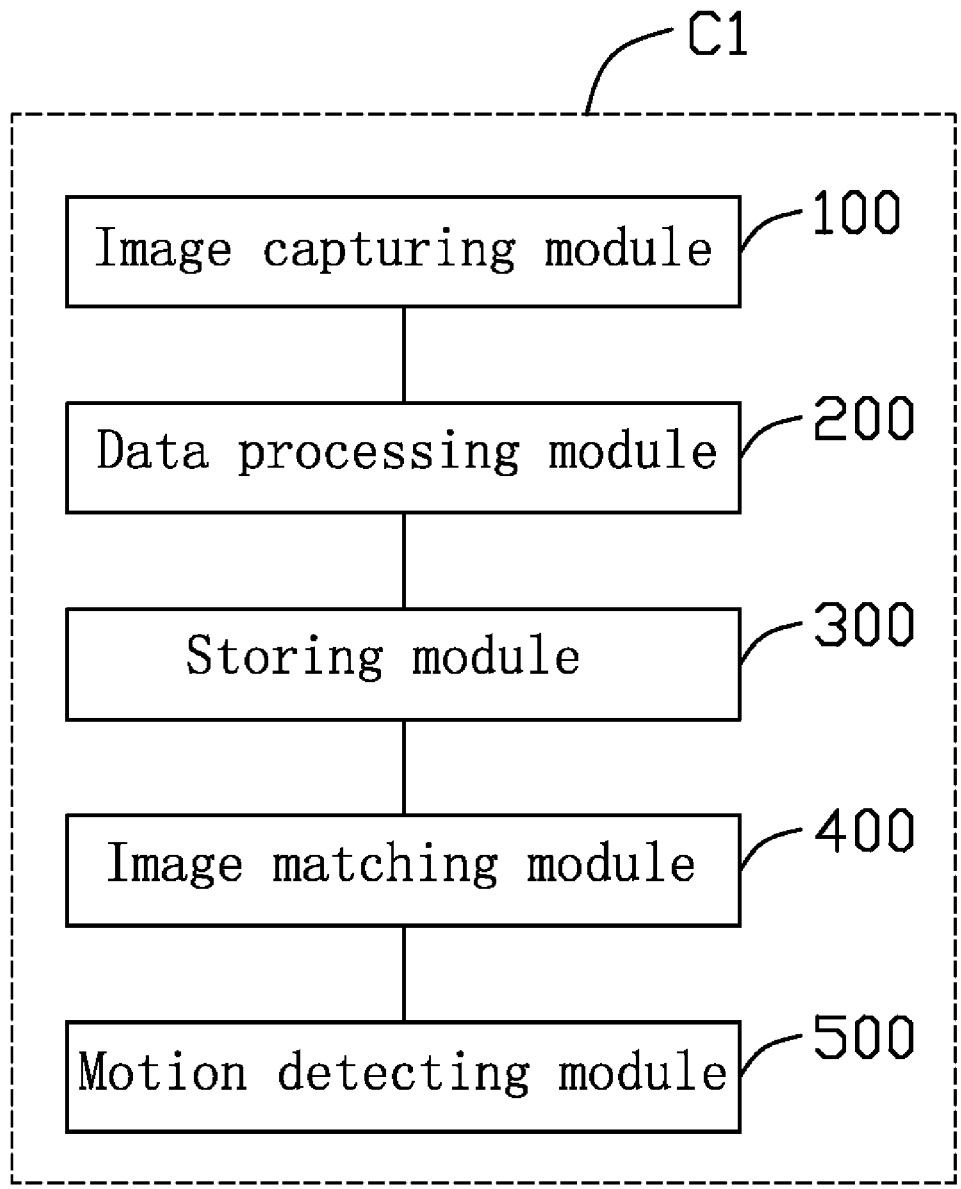
FIG. 1 is a block diagram of an exemplary embodiment of a camera device.

Referring to FIG. 1, an exemplary embodiment of a camera device C1 includes an image capturing module 100, a data processing module 200, a storing module 300, an image matching module 400, and a motion detecting module 500.

The image capturing module 100 captures a plurality of consecutive images of a motion scene. In one exemplary embodiment, the image capturing module 100 may be a charge coupled device (CCD). The motion scene may be a bank vault or an enterprise confidential location where is needed to be monitored for security.

The data processing module 200 is configured for calculating characteristic values of the captured consecutive images. The characteristic values of the captured consecutive images may be obtained by a fast Fourier transform of geometry characteristics, color characteristics, and/or texture characteristics of the consecutive images via the data processing module 200.

The storing module 300 is configured for storing the characteristic values of the captured consecutive images. In one exemplary embodiment, the storing module 300 may be a random access memory (RAM).

The image matching module 400 is configured for matching two consecutive images of the captured consecutive images via an autocorrelation of the characteristic values of the two consecutive images thereby to obtain a corresponding area of the two consecutive images. The two consecutive images of the captured consecutive images is defined from a first image of the captured consecutive images on, such as first image and second image, second image and third image, for example. Further details will be explained below. The autocorrelation is an image processing method of utilizing a correlation of characteristic values of the two consecutive images to find the corresponding area in both of the two consecutive images. The corresponding area is defined as an area appearing in both the two consecutive images and having a certain correlation degree of the characteristic values ranging between about 80%-90%, for example. Further details will be explained below. In other exemplary embodiments, the range of the correlation degree of the corresponding area can be increased or decreased.

The motion detecting module 500 is configured for comparing the characteristic values of the corresponding area in both of the two consecutive images to obtain a motion area of the motion scene. In one exemplary embodiment, an area in the corresponding area, with different characteristic values in the two consecutive images, is defined as the motion area. The camera device C1 may output an alerting signal when the motion area is detected, or/and record the motion area. An example as follows is given for a detailed explanation of the camera device C1.

Figure 2:
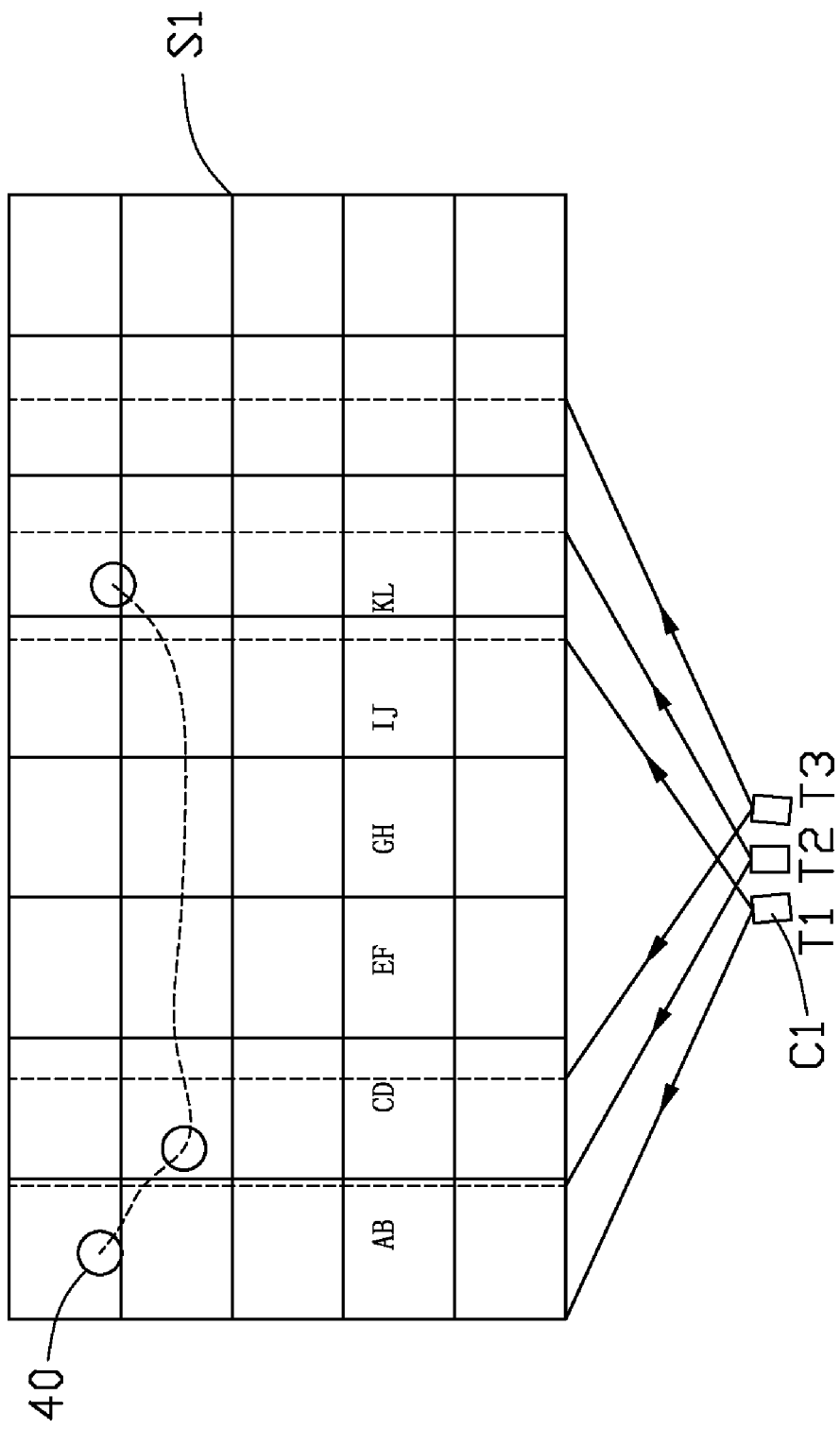
FIG. 2 is a sketch map showing captured consecutive images of a motion scene by the camera device of FIG. 1.
Figure 3:
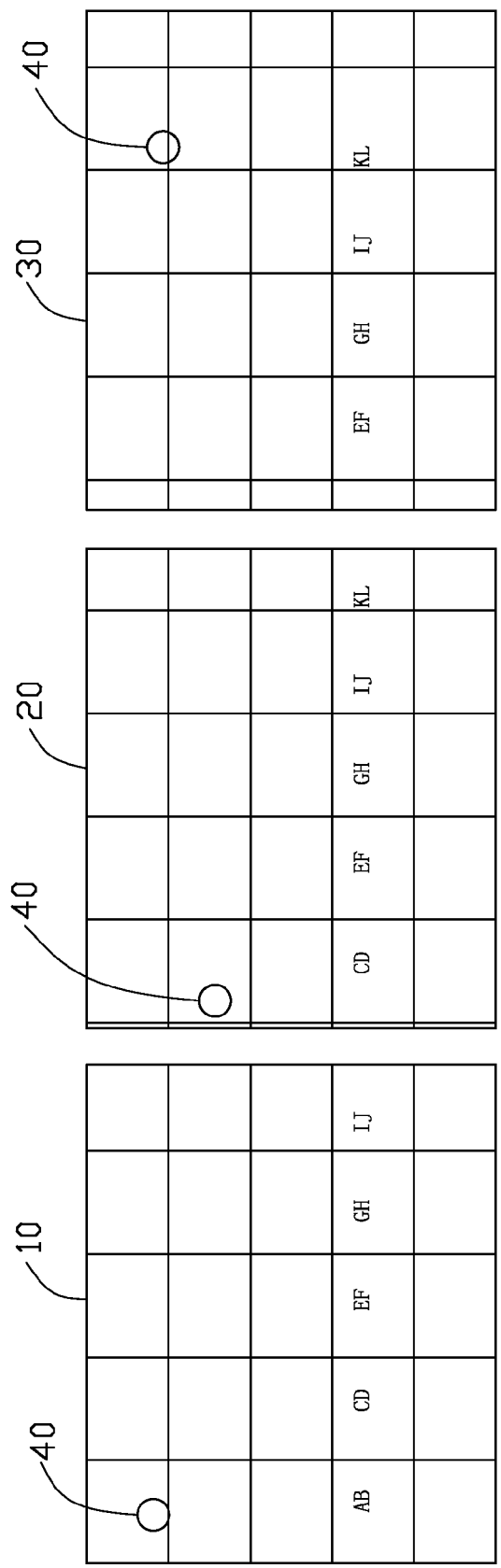
FIG. 3 are sketch maps of three consecutive images captured by the camera device of FIG. 2.

Referring to FIG. 2 and FIG. 3, in use, the camera device C1 may move and continuously capture images of a motion scene S1 having a motion object 40. A first image 10 is captured by the camera device C1 at a first time T1. A second image 20 is captured by the camera device C1 at a second time T2. A third image 30 is captured by the camera device C1 at a third time T3. The first, second, and third images 10, 20, and 30 are three consecutive images captured by the camera device C1 at three continuous times T1, T2, and T3. Characteristic values of the first, second, and third images 10, 20, and 30 are calculated by the data processing module 200 and stored in the storing module 300.

Figure 4:
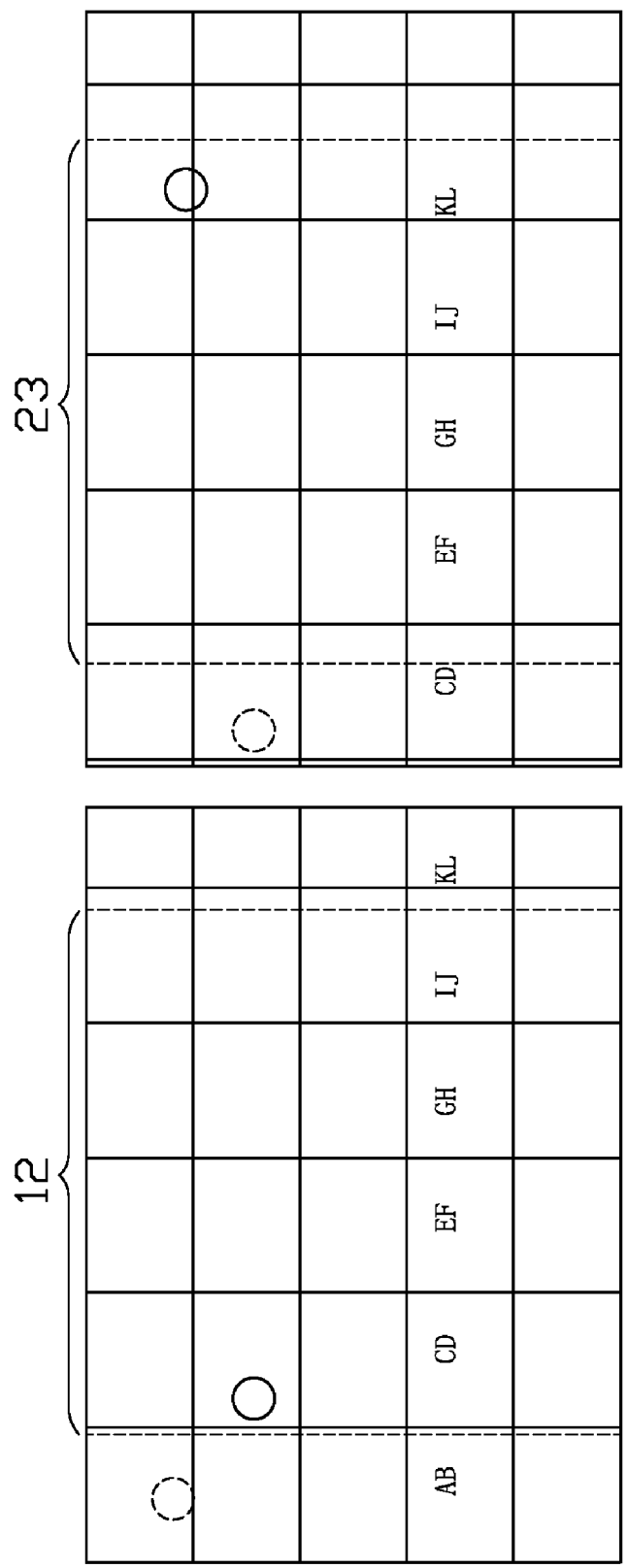
FIG. 4 are sketch maps of corresponding areas between two consecutive images among the three consecutive images of FIG. 3.

Referring to FIG. 4, the image matching module 400 of the camera device C1 matches the first and second images 10, 20 via an autocorrelation of the characteristic values of the first and second images 10 and 20, to obtain a corresponding area 12. That is to say, the corresponding area 12 appears in both of the first image 10 and the second image 20, and the correlation degree of the characteristic values of the corresponding area 12 in both of the first image 10 and the second image 20 is determined as 85%, for example. Therefore, the first image 10 and the second image 20 can be matched via the autocorrelation of the characteristic values to obtain the corresponding area 12. At the same time, the image matching module 400 of the camera device C1 also matches the second and third images 20, 30 via the autocorrelation of the characteristic values of the second and third images 20 and 30, to obtain a corresponding area 23.

Figure 5:
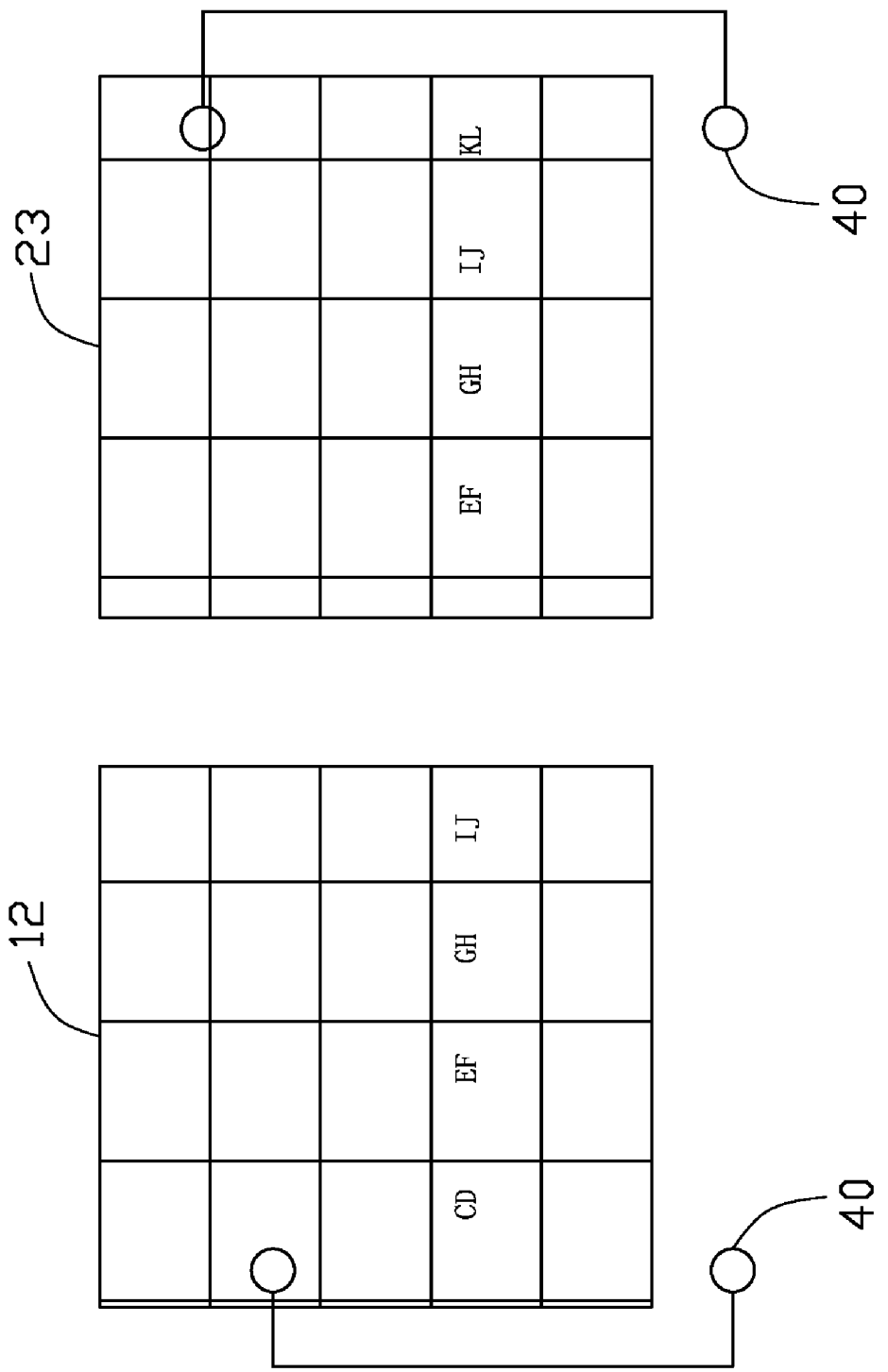
FIG. 5 are sketch maps of motion areas of the corresponding areas of FIG. 4.

Referring to FIG. 5, the motion detecting module 500 compares the characteristic values of the corresponding area 12 in both of the first and second images 10, 20 to obtain an motion area such as the motion object 40 of the motion scene S1. In detail, the motion object 40 which does not appear in the corresponding area 12 of the first image 10 appears in the corresponding area 12 of the second image 20. Therefore, an area with different characteristic values of the corresponding area 12 in the first and second images 10, 20 is the motion area where the motion object 40 is in. At the same time, an area with different characteristic values of the corresponding area 23 in the second and third images 20, 30 is the motion area where the motion object 40 is in.

Figure 6:
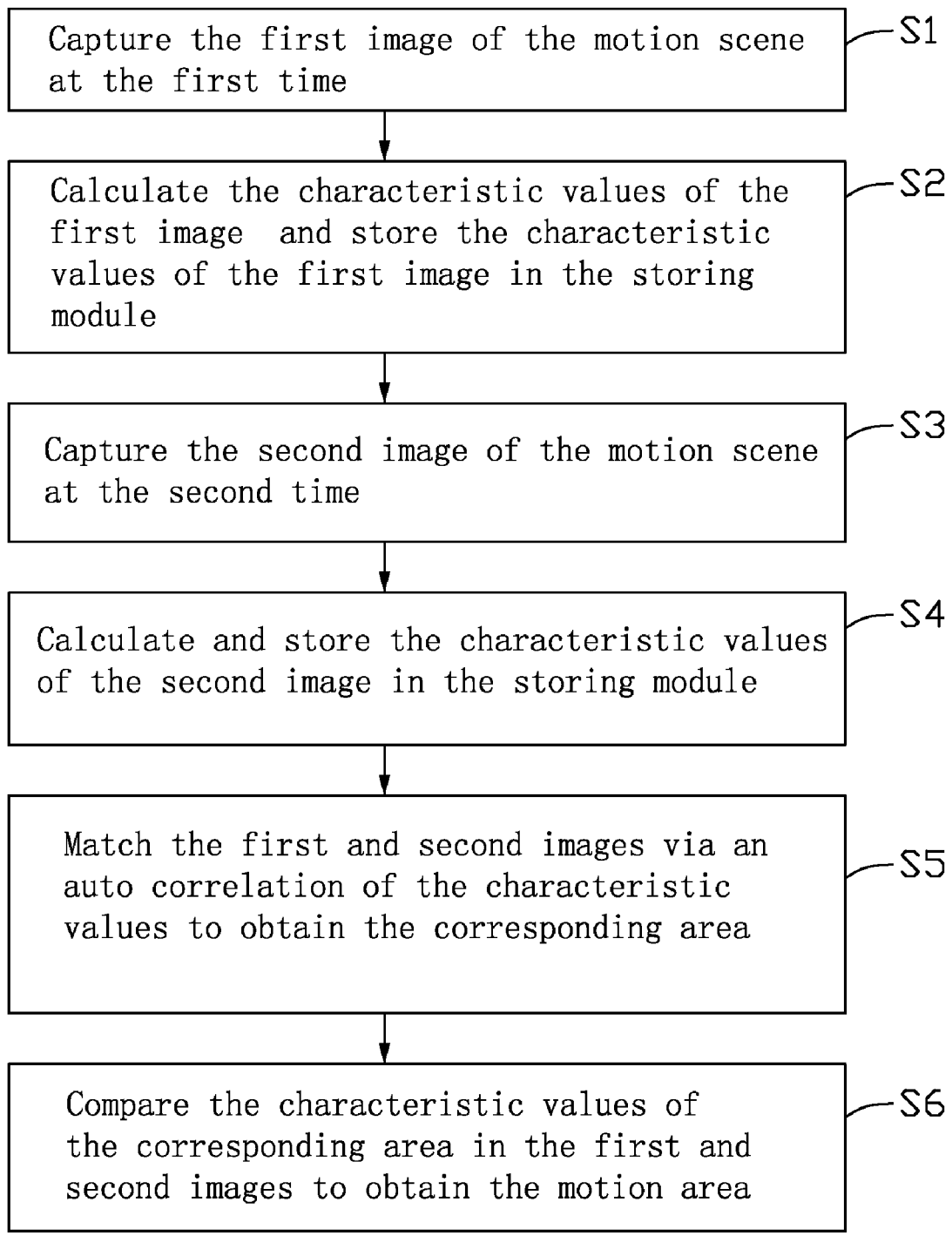
FIG. 6 is a flow diagram of an exemplary embodiment of a motion detection method for the camera device of FIG. 1.

Referring to FIG. 6, a motion detection method for the camera device C1 is provided, which includes the following blocks. Depending on the embodiment, certain blocks described below may be removed, others may be added, and the sequence of the blocks may be altered.

In block S1, the image capturing module 100 captures the first image 10 of the motion scene S1 at the first time T1.

In block S2, the data processing module 200 calculates the characteristic values of the first image 10 and stores the characteristic values of the first image 10 in the storing module 300.

In block S3, the image capturing module 100 captures the second image 20 of the motion scene S1 at the second time T2.

In block S4, the data processing module 200 calculates the characteristic values of the second image 20 and stores the characteristic values of the second image 20 in the storing module 300.

In block S5, the image matching module 400 matches the first and second images 10, 20 via the autocorrelation of the characteristic values of the first and second images 10, 20, to obtain the corresponding area 12 of the first and second images 10, 20.

In block S6, the motion detecting module 500 compares the characteristic values of the corresponding area 12 in both of the first and second images 10, 20, to obtain the motion area of the motion scene S1.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera device used for detecting a motion scene, the device comprising:
    an image capturing module to capture a plurality of consecutive images of the motion scene;
    a data processing module to calculate characteristic values of the plurality of consecutive images captured by the image capturing module;
    a storing module to store the characteristic values of the plurality of consecutive images;
    an image matching module to match two consecutive images of the plurality of consecutive images via an autocorrelation of the characteristic values of the two consecutive images, to obtain corresponding areas having a certain correlation degree in both of the two consecutive images; and
    a motion detecting module to compare the characteristic values of the corresponding areas in both of the two consecutive images, and identify the region therein having different characteristic values as a motion area of the motion scene, thereby detecting the moving object.

2. The device of claim 1, wherein the image capturing module is a charge coupled device.

3. The device of claim 1, wherein the characteristic values of the plurality of images are obtained by a fast Fourier transform of geometry characteristics of the plurality of consecutive images.

4. The device of claim 1, wherein the characteristic values of the plurality of images are obtained by a fast Fourier transform of color characteristics of the plurality of consecutive images.

5. The device of claim 1, wherein the characteristic values of the plurality of images are obtained by a fast Fourier transform of texture characteristics of the plurality of consecutive images.

6. The device of claim 1, wherein the correlation degree of the autocorrelation of the characteristic values of the two consecutive images ranges between about 80%-90%.

7. A motion detection method for a camera device for detecting a motion scene, comprising:
    capturing a first image of the motion scene via an image capturing module at a first time;
    calculating characteristic values of the first image and storing the characteristic values of the first image in a memory system of the camera device;
    capturing a second image of the motion scene via the image capturing module at a second time continuous with the first time;
    calculating the characteristic values of the second image and storing the characteristic values of the second image in the memory system;
    matching the first image and the second image via an autocorrelation of the characteristic values of the first image and the second image, to obtain corresponding areas with a certain correlation degree in both of the first image and the second image; and
    comparing the characteristic values of the corresponding areas in both of the first image and the second image, and identify the region with different characteristic values as a motion area of the motion scene, thereby detecting the moving object.

8. The method of claim 7, wherein the image capturing module is a charge coupled device.

9. The method of claim 7, wherein the characteristic values of the plurality of images are obtained by a fast Fourier transform of geometry characteristics of the plurality of consecutive images.

10. The method of claim 7, wherein the characteristic values of the plurality of images are obtained by a fast Fourier transform of color characteristics of the plurality of consecutive images.

11. The method of claim 7, wherein the characteristic values of the plurality of images are obtained by a fast Fourier transform of texture characteristics of the plurality of consecutive images.

12. The method of claim 7, wherein the correlation degree of the autocorrelation of the characteristic values of the two consecutive images ranges between about 80%-90%.

13. A computer-readable medium having instructions stored thereon that, when executed by a computer comprising an image capturing module, the computer-readable medium causes the computer to:
    capture a first image of the motion scene via the image capturing module at a first time;
    calculate characteristic values of the first image and storing the characteristic values of the first image in a memory system;
    capture a second image of the motion scene via the image capturing module at a second time continuous with the first time;
    calculate the characteristic values of the second image and storing the characteristic values of the second image in the memory system;
    match the first image and the second image via an autocorrelation of the characteristic values of the first image and the second image, to obtain corresponding areas with a certain correlation degree in both of the first image and the second image; and compare the characteristic values of the corresponding areas in both of the first image and the second image, and identify the region with different characteristic values as a motion area of the motion scene, thereby detecting the moving object.

14. The media of claim 13, wherein the image capturing module is a charge coupled device.

15. The media of claim 13, wherein the characteristic values of the plurality of images are obtained by a fast Fourier transform of geometry characteristics of the plurality of consecutive images.

16. The media of claim 13, wherein the characteristic values of the plurality of images are obtained by a fast Fourier transform of color characteristics of the plurality of consecutive images.

17. The media of claim 13, wherein the characteristic values of the plurality of images are obtained by a fast Fourier transform of texture characteristics of the plurality of consecutive images.

18. The media of claim 13, wherein the correlation degree of the autocorrelation of the characteristic values of the two consecutive images ranges between about 80%-90%.

* * * * *